US012351295B2

(12) United States Patent
Ankney

(10) Patent No.: US 12,351,295 B2
(45) Date of Patent: Jul. 8, 2025

(54) FIBER OPTIC SLAT FLAP SYSTEM AND CONTROL LEVER

(71) Applicant: Hamilton Sundstrand Corporation, Charlotte, NC (US)

(72) Inventor: Darrell E. Ankney, Dixon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 221 days.

(21) Appl. No.: 17/990,977

(22) Filed: Nov. 21, 2022

(65) Prior Publication Data

US 2024/0166334 A1 May 23, 2024

(51) Int. Cl.

*B64C 13/04* (2006.01)
*B64C 13/16* (2006.01)
*B64C 13/50* (2006.01)
*G02B 6/12* (2006.01)
*G02F 1/01* (2006.01)

(52) U.S. Cl.

CPC .......... *B64C 13/0425* (2018.01); *B64C 13/16* (2013.01); *B64C 13/503* (2013.01); *G02B 2006/12138* (2013.01); *G02F 1/0134* (2013.01)

(58) Field of Classification Search

CPC .... B64C 13/16; B64C 13/503; B64C 13/0425
See application file for complete search history.

(56) References Cited

U.S. PATENT DOCUMENTS 4,422,180 A 12/1983 Wendt
5,875,818 A * 3/1999 Takats .................. B64C 13/503 91/363 A
6,430,342 B1 * 8/2002 Kim .................. G02B 6/02147 385/39
8,022,835 B2 * 9/2011 Coleman ........... G01D 5/35303 359/638
8,087,619 B2 1/2012 Hanlon et al.
9,327,826 B2 5/2016 Nieman
9,347,312 B2 * 5/2016 Vincelette ............... E21B 47/06
10,712,212 B2 * 7/2020 Liu ........................ B64D 45/00

(Continued)

FOREIGN PATENT DOCUMENTS

DE 4302670 A1 * 8/1994 ............ B63H 25/02
EP 0030477 A1 * 6/1981

(Continued)

OTHER PUBLICATIONS

"Sensing Applications in Aircrafts Using Polymer Optical Fibres" Lallana et al. May 2021 (Year: 2021).*

(Continued)

*Primary Examiner* — Magdalena Topolski

(74) *Attorney, Agent, or Firm* — CANTOR COLBURN LLP

(57) ABSTRACT

A control system performs a method of controlling a wing of an airplane. The control system includes an optical fiber, a bending device and a processor. The optical fiber is configured to receive light having an input optical phase. The bending device applies an external force on the optical fiber. The external force causes the light exiting the optical fiber to have an output optical phase. a processor determines a phase shift between the input optical phase and the output optical phase and controls the wing based on the phase shift.

11 Claims, 4 Drawing Sheets

(56) References Cited

U.S. PATENT DOCUMENTS

| | | | | |
|---|---|---|---|---|
| 11,614,580 | B2 * | 3/2023 | Choi | G01D 5/35374<br>385/37 |
| 11,927,496 | B2 * | 3/2024 | Gadd | G01D 5/35354 |
| 2004/0128038 | A1 | 7/2004 | Richter et al. | |
| 2017/0021914 | A1 * | 1/2017 | Small | B64C 13/16 |
| 2019/0337634 | A1 * | 11/2019 | Geiger | G05D 1/0833 |
| 2019/0375493 | A1 * | 12/2019 | Schwindt | B64C 9/146 |
| 2020/0086972 | A1 | 3/2020 | Batura et al. | |
| 2020/0213012 | A1 | 7/2020 | Laughlin | |

FOREIGN PATENT DOCUMENTS

| | | | | |
|---|---|---|---|---|
| EP | 0429939 | B1 | 6/1995 | |
| EP | 3461740 | A1 | 4/2019 | |
| IT | 1150712 | B * | 12/1986 | B64C 13/503 |
| WO | WO-2015177213 | A1 * | 11/2015 | G01D 5/04 |

OTHER PUBLICATIONS

European Search Report in EP Application No. 23210977.7-1004, mailed Mar. 21, 2024; 9 pages.

* cited by examiner

FIBER OPTIC SLAT FLAP SYSTEM AND CONTROL LEVER

BACKGROUND

Embodiments of the present disclosure relate to airplane operations and, more particular, to a system and method for controlling the positions of a slat and/or a flap on a wing of an airplane.

An airplane wing generally includes a slat at its forward surface and a flap at its anterior. The positions of the slat and the flap can be controlled for different flight operations. Current slat/flap control systems operate by controlling a position of a magnet within an air gap of a transformer. The effectiveness of such control system can deteriorate over time due to changes the airgap, etc. There is a therefore a need for a longer lasting and more reliable control system.

BRIEF DESCRIPTION

According to an embodiment, a method of controlling a wing of an airplane is disclosed. The method includes passing a light having an input optical phase through an optical fiber, applying an external force to the optical fiber to cause the light exiting the optical fiber to have output optical phase, determining a phase shift between the input optical phase and the output optical phase, and controlling the wing of the airplane based on the phase shift.

In addition to one or more of the features described above, controlling the wing further includes adjusting one of a slat and a flap of the wing to a position corresponding to the phase shift.

In addition to one or more of the features described above, the method further includes rotating a cam having a cam surface in contact with the optical fiber to apply the external force to the optical fiber.

In addition to one or more of the features described above, a magnitude of the external force is related to a radius of the cam at a circumferential location of the cam surface that is in contact with the optical fiber.

In addition to one or more of the features described above, the method further includes rotating the cam using a lever.

In addition to one or more of the features described above, controlling the wing further includes sending a command signal to the wing, wherein the command signal is an optical signal.

In addition to one or more of the features described above, the method further includes bending the optical fiber to produce the phase shift using the external force.

According to another embodiment, a control system for a wing of an airplane is disclosed. The control system includes an optical fiber configured to receive light having an input optical phase. a bending device that applies an external force on the optical fiber, wherein the external force causes the light exiting the optical fiber to have an output optical phase, and a processor configured to determine a phase shift between the input optical phase and the output optical phase and control the wing based on the phase shift.

In addition to one or more of the features described above, the processor is configured to control the wing by adjusting one of a slat and a flap to a position based on by the phase shift.

In addition to one or more of the features described above, the bending device further comprises a cam having a cam surface in contact with the optical fiber.

In addition to one or more of the features described above, the cam is configured to rotate one to apply the external force to the optical fiber.

In addition to one or more of the features described above, a magnitude of the external force is related to a radius of the cam at a circumferential location of the cam surface that is in contact with the optical fiber.

In addition to one or more of the features described above, the control system further includes a lever for rotating the cam.

In addition to one or more of the features described above, a detent position of the cam corresponds to a selected phase shift of the light in the optical fiber.

In addition to one or more of the features described above, the processor is further configured to send a command signal to the wing, wherein the command signal is an optical signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
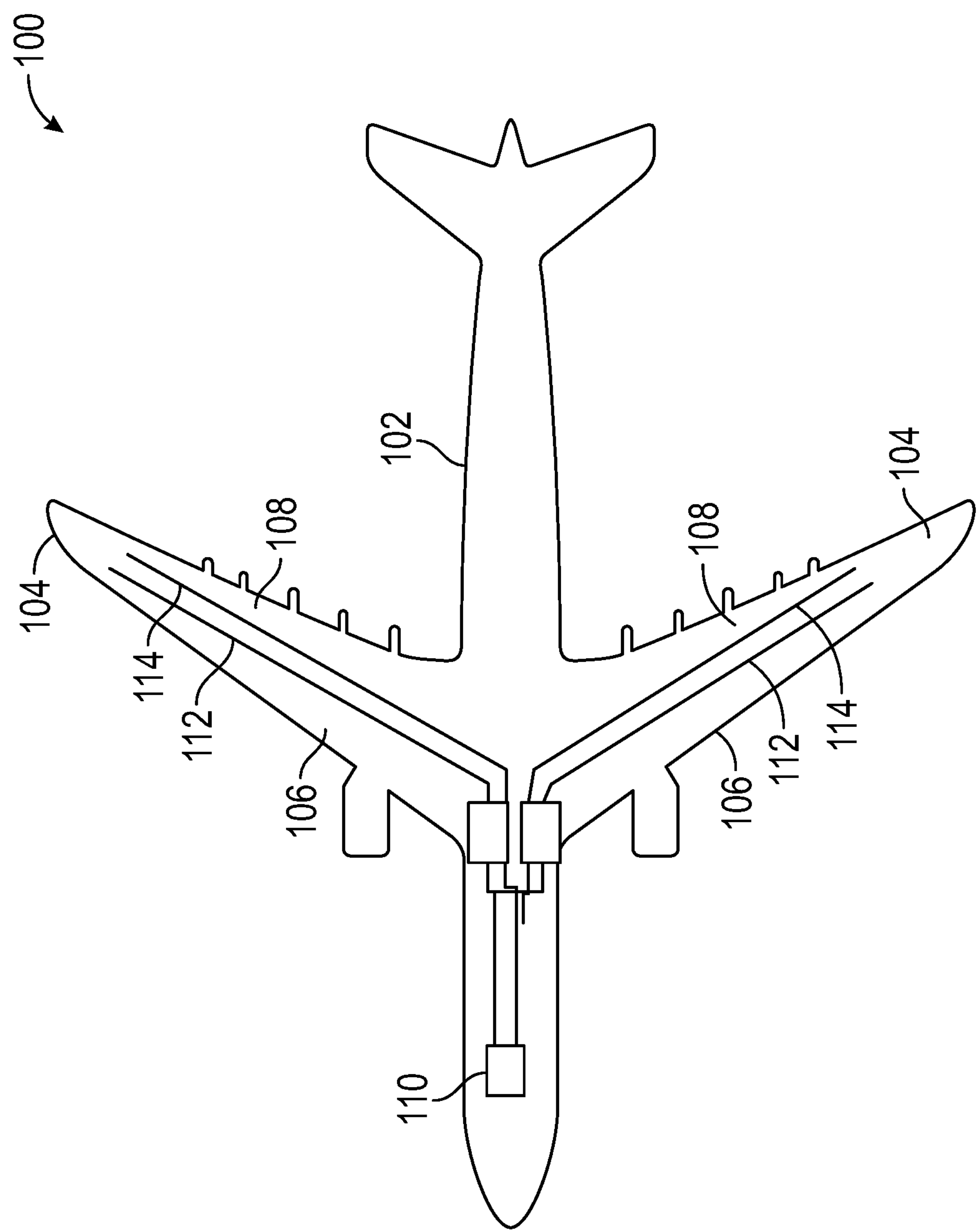
FIG. 1 shows an airplane in a plan view.

With reference now to FIG. 1, an airplane 100 is shown in a plan view. The airplane 100 includes a fuselage 102 and wings 104. Each wing 104 includes a slat 106 and a flap 108. In various embodiments, a wing 104 can include a plurality of slats and/or a plurality of flaps 108. A slat 106 is a surface on a forward or leading edge of the wing 104. When deployed, a slat 106 allows the wing 104 to operate at a higher angle of attack. A flap 108 is a surface on a trailing edge of the wing 104 and is used to increase a drag on the airplane 100 when deployed.

A cockpit 110 sends signals for controlling the operation of the slats 106 and the flaps. In various embodiments, the cockpit 110 sends an optical slat/flap command along one or more optical fibers. As shown in FIG. 1, a slat control optical fiber 112 extends along a wing 104 to one or more of the slats 106 and a flap control optical fiber 114 extends along a wing 104 to one or more of the flaps 108.

Figure 2:
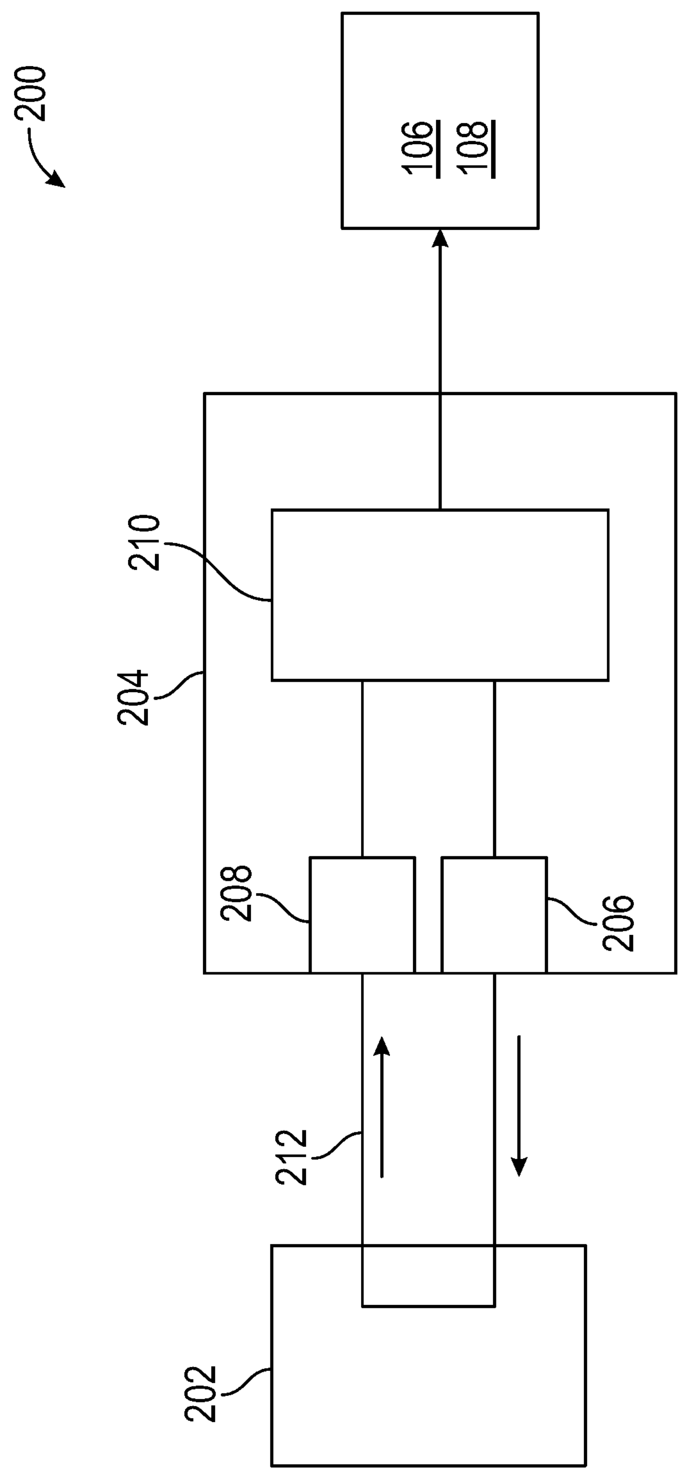
FIG. 2 shows a schematic diagram of a control system location in a cockpit of the airplane.

FIG. 2 shows a schematic diagram of a control system 200 location in the cockpit 110. The control system 200 includes a position selector 202 and an interrogator unit 204. The position selector 202 is used to selects a position for a slat 106 and/or a flap 108. The interrogator unit 204 includes a light source 206, such as a laser, a light detector 208, and a processor 210. The processor 210 can send an electrical signal to the light source 206, which generates a light having an input phase in response. The light is input to an optical fiber 212 that passes from the light source 206, through the position selector 202 and then on to the light detector 208. The position selector 202 can alter, adjust or control an optical phase of the light passing through the optical fiber 212. Thus, the light received at the light detector 208 has an output optical phase. The output optical phase can be the same as the input optical phase or can be different from the input optical phase depending on whether or not an adjustment is made to the optical phase at the position selector 202. The light detector 208 sends an electrical signal to the processor 210 in response to the received light. The electrical signal includes information on the output phase of the received light. The processor 210 determines a difference of phase shift between the input phase and the output phase. Based on the difference, the processor 210 selects a corresponding position for one or more of the slats 106 and flaps 108 and sends a command signal to the one or more of the slats 106 and flaps 108 in order to place them in the selected position. The processor 210 can match the difference between input phase and output phases to a corresponding slat/flap position using a lookup table, an algorithm, etc. The command signal can be an optical signal that is sent to the slats 106 and/or flaps 108 along an optical fiber.

Figure 3:
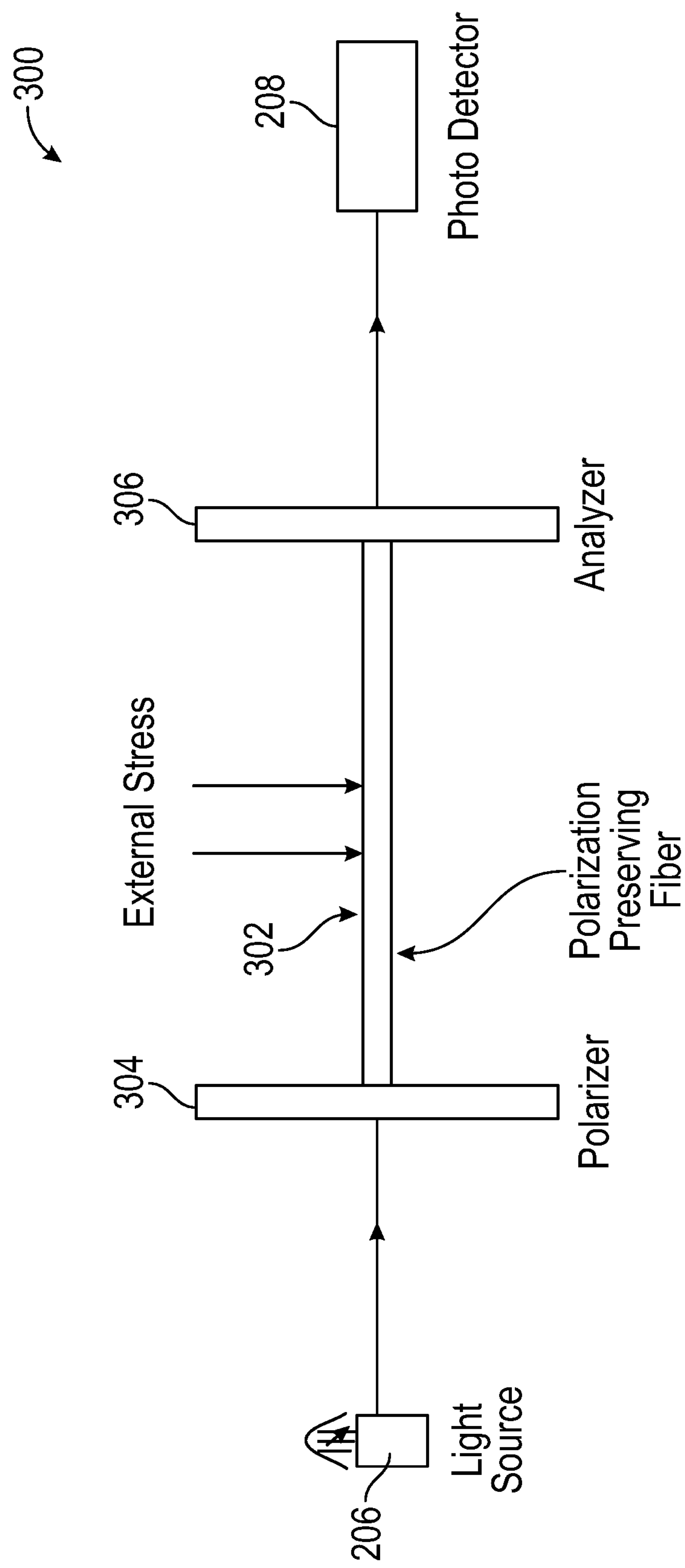
FIG. 3 shows a diagram of a path of an optical fiber of the control system, in an embodiment.

FIG. 3 shows a diagram 300 of a path of the optical fiber 212, in an embodiment. The optical fiber 212 extends from the light source 206 to light detector 208 and passes through a modulation zone 302. A polarizer 304 is at an input end of the modulation zone 302 and an analyzer 306 is at an output end of the modulation zone 302. The polarizer 304 produces polarized light in the modulation zone 302. The analyzer 306 is used to determine the polarity of the light exiting the modulation zone 302. In the modulation zone 302, an external force can be applied to the optical fiber 212 causing the optical fiber to bend. The phase of the light in the modulation zone 302 changes in proportion to the degree of bending produced by the external force.

Figure 4:
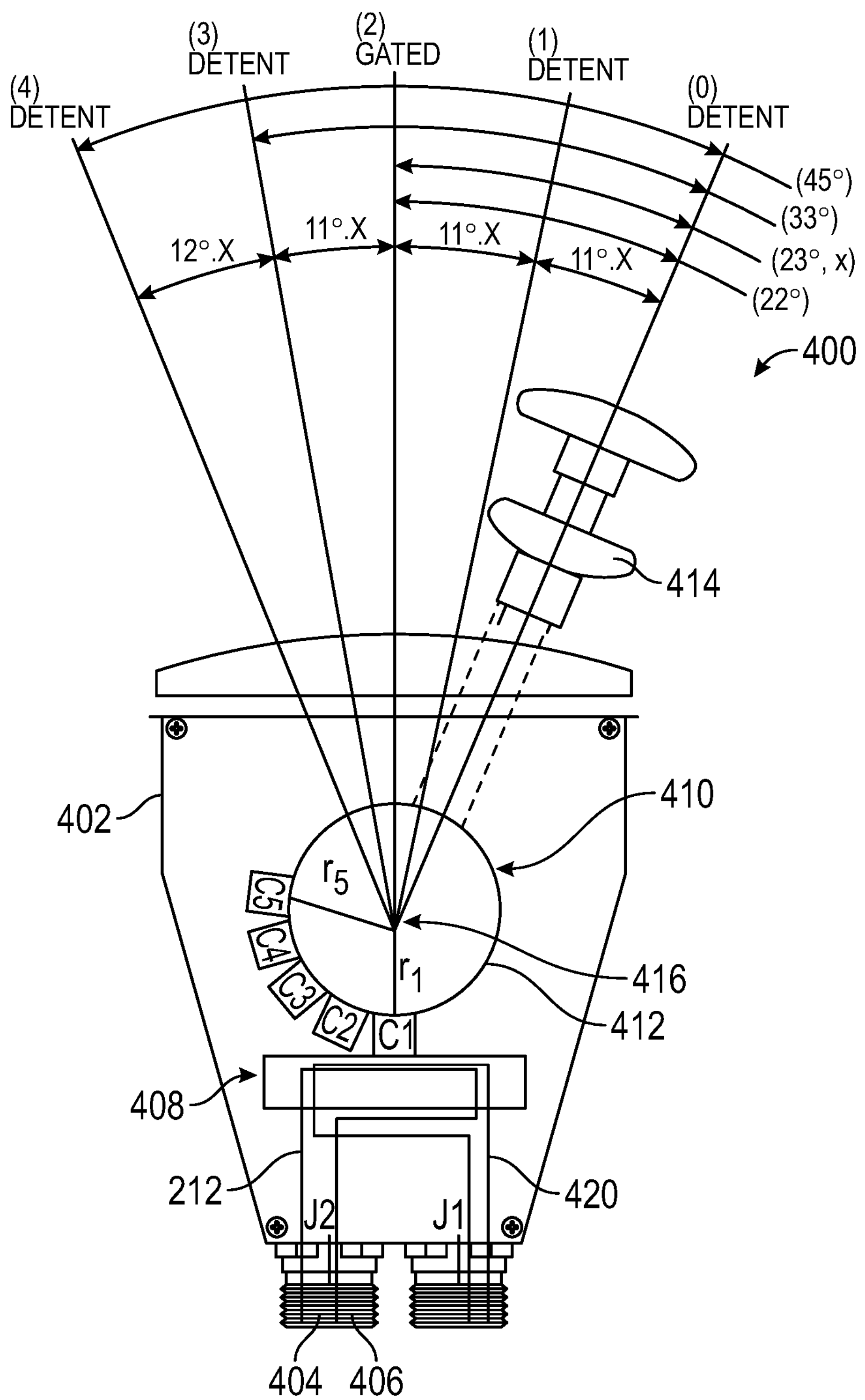
FIG. 4 is a diagram illustrating details of a position selector of the control system.

FIG. 4 is a diagram 400 illustrating details of the position selector 202. The position selector 202 includes a housing 402 having a fiber entrance 404 and a fiber exit 406. The optical fiber 212 passes through the fiber entrance 404 and runs along a pressure modulation block 408 before passing through the fiber exit 406. The pressure modulation block 408 corresponds to the modulation zone 302. The pressure modulation block 408 can suspend the modulation zone 302 of the optical fiber 212, allowing the optical fiber 212 to bend when an external force is applied. A cam 410 is in contact with the modulation zone 302 of the optical fiber 212 at the modulation block 408. The cam 410 acts as a bending device that applies an external force on the optical fiber 212 to bend the optical fiber 212. The cam 410 has a cam surface 412 that is in contact with the optical fiber 212 in the modulation zone 302. The cam 410 can be rotated so that the cam surface 412 makes contact with the optical fiber 212 at different circumferential locations of the cam surface 412. Illustrative circumferential locations are labelled from C1 to C5. A lever 414 is connected to the cam 410 and is used to rotate the cam 410. Each circumferential location C1-C5 can be in contact with the optical fiber 212 when the cam 410 (and lever 414) is in a detent position. Thus, each detent position of the cam 410 corresponds to a selected phase shift of the light in the optical fiber 212.

The radius $r_1$ of the cam 410 at the first circumferential location C1 is a smallest radius and the radius $r_5$ at the fifth circumferential location C5 is a largest radius, with the radii increasing sequentially from C1 to C5. The rotational axis 416 of the cam 410 is held at a fixed distance from the optical fiber 212. Thus, rotating the cam 410 causes different circumferential locations C1 through C5 to contact the optical fiber 212, with each circumferential location C1-C5 introducing a different external force on the optical fiber 212 to bend the optical fiber 212, thereby introducing a different phase shift of the light in the optical fiber 212. The magnitude of the external force is related to the radius of the cam 410 at the circumferential location of the cam surface 412 in contact with the optical fiber 212. As an illustrative example, circumferential location C1 can correspond to no external force and thus no phase shift, while circumferential location C5 can correspond to a largest external force and thus largest phase shift.

As shown in FIG. 4, a second optical fiber 420 can be provided alongside optical fiber 212. The second optical fiber 420 is affected by forces applied by the cam 410 similar to the optical fiber 212 and thus provides a redundant signal which can be used for quality control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling a wing of an airplane, comprising:

passing a light through a modulation zone of an optical fiber, the modulation zone suspended between an entrance and an exit of a pressure modulation block, wherein the light has an input optical phase at the entrance of the pressure modulation block and an output optical phase at the exit of the pressure modulation block;

rotating a cam about a rotational axis to apply an external force to the optical fiber, the cam including a cam surface in contact with the optical fiber in the modulation zone for applying the external force, wherein rotating the cam about the rotational axis changes the external force on the optical fiber, thereby changing a bend of the optical fiber in the modulation zone and thus changing an output optical phase of the light at the exit;

determining a phase shift between the input optical phase and the output optical phase; and controlling the wing of the airplane based on the phase shift.

2. The method of claim 1, wherein controlling the wing further comprises adjusting one of a slat and a flap of the wing to a position corresponding to the phase shift.

3. The method of claim 1, wherein a magnitude of the external force is related to a radius of the cam at a circumferential location of the cam surface that is in contact with the optical fiber.

4. The method of claim 1, further comprising rotating the cam using a lever.

5. The method of claim 1, wherein controlling the wing further comprises sending a command signal to the wing, wherein the command signal is an optical signal.

6. A control system for a wing of an airplane, comprising:

an optical fiber including a modulation zone suspended between an entrance and an exit of a pressure modulation block, wherein the optical fiber is configured to receive light having an input optical phase at the entrance and output a light having an output optical phase at the exit;

a bending device that applies an external force on the optical fiber, the bending device including a cam rotatable about a rotational axis and having a cam surface in contact with the optical fiber in the modulation zone for applying the external force, wherein rotating the cam about the rotational axis changes the external force on the optical fiber, thereby changing a bend of the optical fiber in the modulation zone and thus changing an output optical phase of the light at the exit; and a processor configured to determine a phase shift between the input optical phase and the output optical phase and control the wing based on the phase shift.

7. The control system of claim 6, wherein the processor is configured to control the wing by adjusting one of a slat and a flap to a position based on by the phase shift.

8. The control system of claim 6, wherein a magnitude of the external force is related to a radius of the cam at a circumferential location of the cam surface that is in contact with the optical fiber.

9. The control system of claim 6, further comprising a lever for rotating the cam.

10. The control system of claim 6, wherein a detent position of the cam corresponds to a selected phase shift of the light in the optical fiber.

11. The control system of claim 6, wherein the processor is further configured to send a command signal to the wing, wherein the command signal is an optical signal.

* * * * *